United States Patent
Krishnamurthy et al.

(10) Patent No.: US 9,342,464 B2
(45) Date of Patent: May 17, 2016

(54) SOCIAL CACHE

(71) Applicant: Facebook, Inc., Menlo Park, CA (US)

(72) Inventors: Rajiv Krishnamurthy, Sunnyvale, CA (US); Xiaojun Liang, Menlo Park, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 14/868,249

(22) Filed: Sep. 28, 2015

(65) Prior Publication Data

US 2016/0019167 A1    Jan. 21, 2016

Related U.S. Application Data

(63) Continuation of application No. 13/830,647, filed on Mar. 14, 2013, now Pat. No. 9,177,072.

(51) Int. Cl.
*G06F 17/30* (2006.01)
*G06F 12/12* (2016.01)

(52) U.S. Cl.
CPC .......... *G06F 12/126* (2013.01); *G06F 17/3089* (2013.01); *G06F 2212/1021* (2013.01); *G06F 2212/154* (2013.01); *G06F 2212/608* (2013.01); *G06F 2212/69* (2013.01)

(58) Field of Classification Search
CPC ............. G06F 17/3089; G06F 12/126; G06F 2212/1021; G06F 2212/154; G06F 2212/608; G06F 2212/69
USPC ........................................................ 707/748
See application file for complete search history.

(56) References Cited

U.S. PATENT DOCUMENTS

| | | | | |
|---|---|---|---|---|
| 6,425,057 B1* | 7/2002 | Cherkasova | .......... | G06F 12/121 709/219 |
| 8,655,842 B2 | 2/2014 | Xu | | |
| 2011/0196855 A1 | 8/2011 | Wable et al. | | |
| 2013/0159274 A1 | 6/2013 | Silberstein et al. | | |
| 2013/0325942 A1* | 12/2013 | Chen | .................. | H04L 65/4084 709/204 |
| 2014/0046955 A1 | 2/2014 | Dollard | | |

(Continued)

OTHER PUBLICATIONS

Kataria, Puneet, "Content Name Resolution Service Implementation for Cache and Forward Network Architecture", Master of Science Thesis, Graduate Program in Electrical and Computer Engineering, Rutgers University, New Brunswick, NJ, Oct. 2010, 59 pages.*

(Continued)

*Primary Examiner* — Robert Stevens
(74) *Attorney, Agent, or Firm* — Perkins Coie LLP

(57) ABSTRACT

Various embodiments relating to a social cache replacement policy are described. The techniques of the present invention disclosed utilize social network properties to guide a cache replacement policy executed by a social networking platform system. In one embodiment, a method is provided for determining a queue location to cache a data item based on a popularity score computed from social network properties. In one embodiment, a method is provided for computing the popularity score by incorporating a user's social network properties and the user's friends' social network properties. In embodiments, the popularity score may be computed using a plurality of social network properties, which may include social network properties associated with (i) the user, (ii) the consumer(s), and/or (iii) the data item(s). In embodiments, a plurality of popularity scores are maintained in a user-score database, where the plurality of popularity scores are periodically updated using historical data.

20 Claims, 6 Drawing Sheets

(56) References Cited

U.S. PATENT DOCUMENTS

| | | | |
|---|---|---|---|
| 2014/0129779 A1* | 5/2014 | Frachtenberg | G06F 12/123 711/136 |
| 2014/0188995 A1 | 7/2014 | Fullarton et al. | |
| 2014/0215156 A1* | 7/2014 | Park | G06F 12/0888 711/119 |
| 2014/0223107 A1* | 8/2014 | Sadok | H04N 21/23113 711/136 |
| 2014/0280206 A1 | 9/2014 | Krishnamurthy et al. | |

OTHER PUBLICATIONS

Non-Final Office Action mailed Feb. 25, 2015, for U.S. Appl. No. 13/830,647, of Krishnamurthy, R. et al., filed Mar. 14, 2013.

Notice of Allowance mailed Sep. 23, 2015, for U.S. Appl. No. 13/830,647, of Krishnamurthy, R. et al., filed Mar. 14, 2013.

Lu, Han et al., "Social Butterfly: Social Caches for Distributed Social Networks", PASSAT/SocialCom 2011, Boston, MA, Oct. 9-11, 2011, pp. 81-86.

* cited by examiner

SOCIAL CACHE

CLAIM OF PRIORITY

This application is a Continuation of U.S. patent application Ser. No. 13/830,647 entitled "SOCIAL CACHE," filed Mar. 14, 2013, the entire content of which is expressly incorporated herein by reference.

FIELD OF THE INVENTION

Various embodiments of the present invention generally relate to caching policies. More specifically, various embodiments of the present invention relate to systems and methods for a social cache replacement policy based on social network properties.

BACKGROUND

Caching is a mechanism that accelerates data access from storage media by managing a subset of the data in a smaller, faster, and typically more expensive storage medium. Caches come in many shapes and forms. Caches may be embodied, for example, in hardware (e.g., CPU caches) and/or in software (e.g., Memcached). In some cases, caches may also be layered across several storage layers or tiers.

One of the main metrics of successful cache implementation is the cache hit ratio. The cache hit ratio is the ratio of all data accesses that may be served by the cache. For example, a webserver of a social networking service typically stores frequently requested content in a cache memory to serve readily to users upon access requests. If the content requested is not in the cache (i.e., "cache miss" instead of "cache hit"), the content has to be fetched from storage, and a computing delay results. An access management system, operated by the webserver, follows a cache replacement policy (e.g., LRU, CRU, etc.) to determine which content to retain (or replace) in the cache memory, such that the high cache hit ratio may be achieved upon access requests from users.

Many efforts have been attempted to improve cache replacement policies with the goal to retain items that are highly likely to be requested from the cache. Typically, these cache replacement policies (e.g., LRU) have been based on temporal metrics (e.g., oldest items are always evicted to make room for new items). As such, data with a high likelihood of being immediately requested may be evicted in some case, resulting in low cache-hit ratio, computing inefficiency, and poor user experience.

SUMMARY

Techniques described herein provide for a social cache replacement policy that makes use of social network properties to guide a cache replacement policy executed by a social networking platform system. These social network properties are generally readily available as historical data maintained by social networking services. As a result, various embodiments of the techniques disclosed may be advantageously applied to, or integrated within, a variety of cache replacement policies (e.g., LRU, CRU, etc.), so long as "social" historical data are available.

In one embodiment, a method is provided for determining a queue location to cache a content item according to a social cache replacement policy. In embodiments, the social cache replacement policy utilizes a popularity score that incorporates social network properties associated with a social networking service. The content item is stored in the cache at the queue location determined by the popularity score.

In one embodiment, a method is provided for computing the popularity score for a user of the social networking service. In embodiments, the social networking platform system uses a scoring mechanism to compute the popularity score. The scoring mechanism employs a formula that incorporates social network properties associated with the user and with the user's social network of friends to compute the popularity score.

In one embodiment, a plurality of popularity scores for a plurality of users on the social networking service are computed and stored in a user-score database. In embodiments, the popularity score for each user is computed using a plurality of social network properties, which may include social network properties associated with (i) the user, (ii) the consumer(s) (i.e., user(s) authorized to access, or consume, content posted by the user such as the user's social network of friends), and/or (iii) the content items (i.e., content posted by the user). In embodiments, the user-score database is periodically updated by re-computing the plurality of popularity scores. The periodical update utilizes historical data containing the plurality of social network properties.

While multiple embodiments are disclosed, still other embodiments of the present invention will become apparent to those skilled in the art from the following Detailed Description, which shows and describes illustrative embodiments of the present invention. As will be realized, the present invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Examples of techniques for implementing a social cache replacement policy are illustrated in the figures.

DETAILED DESCRIPTION

Figure 1:
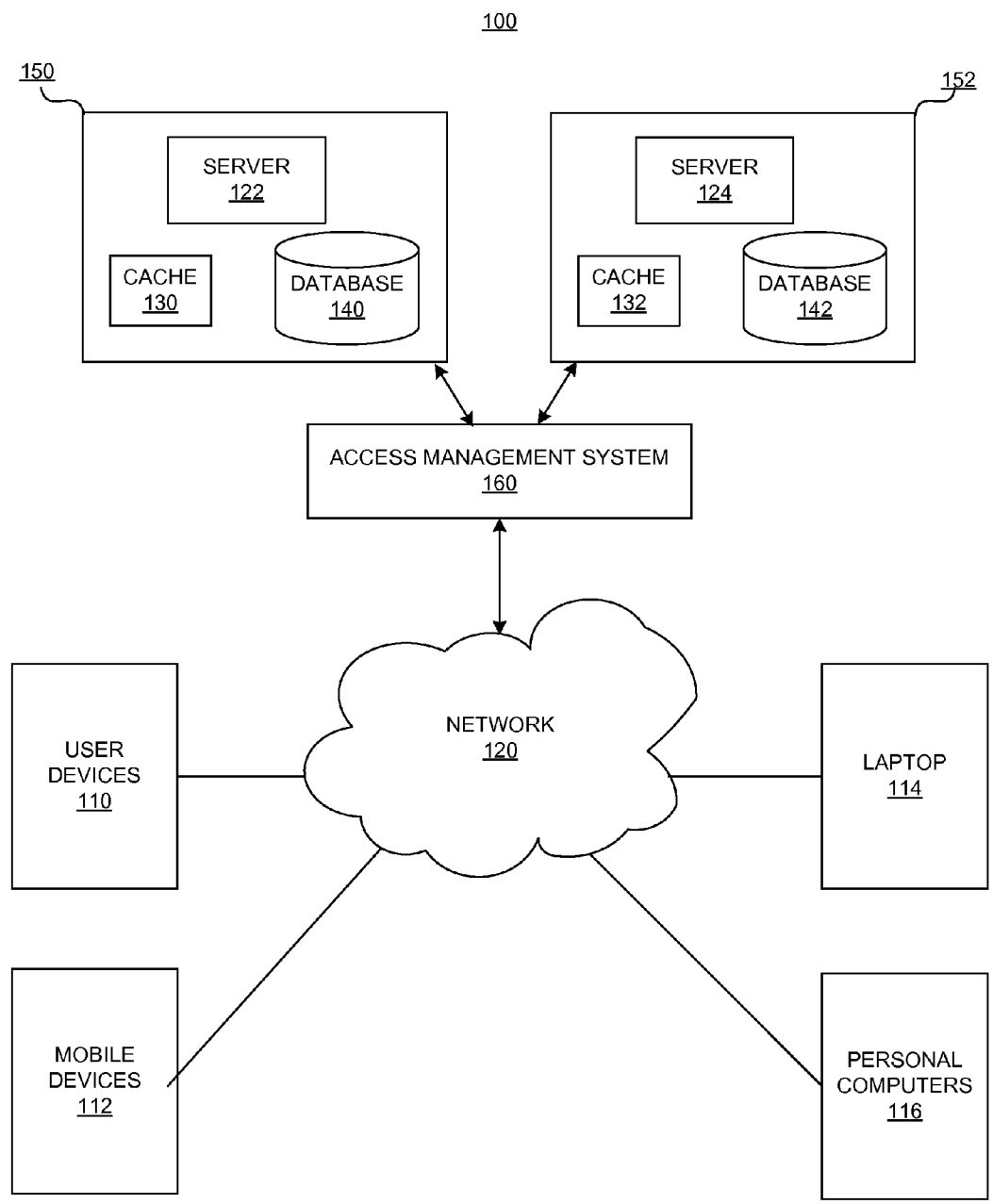
FIG. 1 illustrates an example of a networked-based environment in which some embodiments of the present invention may be utilized.

Various embodiments relating to a social cache replacement policy (or simply, "social cache policy") are described. Typically, cache replacement policies uses temporal metrics (e.g., first in time gets ejected) for determining which data items to replace in a cache in order to make room for new data items being copied into the cache. In contrast, the techniques of the present invention disclosed herein utilize social network properties to guide a cache replacement policy executed by a social networking platform system. In particular, the techniques aim to identify and retain the data items having a high likelihood of being immediately requested within a near future by looking to a popularity score.

The popularity score utilized by the techniques may be determined using a scoring mechanism that takes into consideration a plurality of social properties. These social network properties (or simply, "social properties") are generally readily available as historical data maintained by social networking services. As a result, various embodiments of the techniques disclosed may be advantageously applied to a variety of cache replacement policies (e.g., LRU, CRU, etc.), so long as "social" historical data are available. For example, a social networking service, which retains social graph data, may incorporate the social cache policy with a LRU algorithm in the management of its cached content to serve users' access requests. Under this incorporated management, a given content item residing in the tail-end location of the cache queue will be the one rejected to make room for any new item being cached, where that given item has been placed originally in the tail end based on its associated low popularity score.

In one embodiment, a method is provided for determining a location to insert (or store) a content item into a cache queue by utilizing a social cache replacement policy. In embodiments, the social cache replacement policy is based on a popularity score that incorporates social properties associated with a social networking platform system (or simply, "networking platform system") that manages contents of a social networking service (or simply, "networking service"). Under the social cache replacement policy, the networking platform system utilizes the popularity score to determine the queue location for one or more content items being copied into the cache.

The term "networking service" as used herein refers to an online platform, service, or site that focuses on facilitating the building of social networks or social relations among people (i.e., "users") who, for example, share interests, activities, backgrounds, or real-life connections. A networking service consists of a representation of each user (often a profile), his/her social connections, and a variety of additional services. In embodiments, the networking service is web-based and provides means for users to connect over the Internet. In general, the networking service allows users to share ideas, activities, events, and interests within their individual networks. For example, a user is presented with a "newsfeed" containing information updates about various social activities of other users with whom the user is connected through the networking service (e.g., a newsfeed displaying an update about a content item newly posted by a friend on a FACEBOOK® wall).

The term "networking platform system" as used herein refers to the computing architecture on which the networking service operates. For example, the networking platform system may record and maintain, subject to any privacy policies and/or settings, historical data related to users' social activities, social connections, etc. on the networking service. In another example, the networking platform system may manage a cache replacement policy for the cache memory utilized by the networking service to service users' access requests to contents.

The term "content item" as used herein may include a variety of content generated by a user (or simply, "posting user") using the networking service. For example, a content item includes a photograph posted by the posting user (e.g., a photograph pinned on a PINTEREST® board), a video posted by the posting user (e.g., a video uploaded on the posting user's FACEBOOK® wall), a news article shared by the posting user (e.g., a URL link posted on a TWITTER® status message for sharing the news with other users), a message posted by the posting user on another user's social network space (e.g., a wall posting on a friend's FACEBOOK® page), etc. Further, the "content item" may be referred to as an object, a datum, an item, etc. as understood by those of ordinary skills in the art to be a data unit being stored in a cache queue, where the item is representative of the data embodied in the content generated by a posting user.

In embodiments, the content item is deemed worthy of being stored (or retained) in the cache queue if there is a likelihood that the content item will be immediately accessed (i.e., requested from the queue), subsequent to its posting, by other users on the networking service. The networking platform system determines whether the content item is likely to be immediately requested by looking to a "popularity score." The term "popularity score" as described herein is a numerical value that embodies the 'popularity' of an entity (e.g., a posting user, a content item, etc.), and provides a ranking in relation to other entities (e.g., other users, other content items, etc.) on the networking platform system. For example, an item posted by a user having a high popularity score is more likely to be accessed by other users (i.e., immediately requested from the cache) than an item posted by a user with a low popularity score. Thus, retaining such item belonging to the popular user will likely achieve a better cache-hit ratio and improved user experience (e.g., a user's access request is readily served by the cache).

In some instances, the popularity score may be associated with a posting user (i.e., the original user who has posted the content item) to indicate the posting user's popularity. In other instances, the popularity score may be associated with a content item to indicate the content item's popularity. In yet other instances, the popularity score may be associated with a consumer of the content item (i.e., a user who accesses the posted content item) to indicate the consumer's popularity. For example, former President Bill Clinton is a consumer with a high popularity score, such that his consumption (or access) of any content item, posted by another user, will attract great interest from other users, regardless of the posting user's popularity score. As such, storing the content item that has been accessed by former President Bill Clinton will likely improve the cache-hit ratio. In all these varying instances of the popularity score, the computation of the score is based on social properties, albeit different combinations of social properties.

In embodiments, the method for determining a queue location comprises receiving the content item from the posting user, identifying a popularity score associated with the posting user, and determining a queue location based on the popularity score. In this approach, the networking platform system utilizes the popularity score to serve as an indication, or hint, of whether the posting user is sufficiently "popular" to attract interest from other users to access the content item (i.e., how likely the posting user's content item will be immediately accessed subsequent to its posting). Based on the identified popularity score, the networking platform system inserts the content item into the appropriate queue location. As a result, a more popular user's content item may reside in a more favorable queue location (i.e., likely not to be ejected) than a less popular user's item. For example, a content item belonging to a user with a high popularity score, pre-computed based on social properties, are inserted in the front of the cache queue, ahead of items belonging to a user with a low popularity score. In some instances, the networking platform system may decide not to insert (or store) a particular content item at all if the popularity score of the posting user indicates that the item will not likely be accessed (i.e., not sufficiently popular to attract other users' interest). In embodiments, the networking platform system may choose to utilize either a deterministic scheme or a stochastic scheme, with the popularity score incorporated, when evaluating the appropriate queue location.

In one embodiment, a method is provided for computing the popularity score for a plurality of users of the networking platform system. In embodiments, the networking platform system uses a scoring mechanism to pre-compute the popularity score ahead of time. The scoring mechanism employs a plurality of social properties to compute the popularity score. The plurality of social properties may include (i) social properties associated with the posting user, (ii) social properties associated with the user(s) accessing the content item (or simply, the "consumer"), and/or (iii) social properties associated with the content item posted by the posting user.

The term "consumer" as used herein refers to any user(s) that are authorized to access (e.g., to view, to share, to comment, etc.), or consume, a particular posted content item according to the privacy policies and/or settings of the networking platform system. Depending on the privacy policies and/or settings, the number of consumers may be restricted to one user, or expanded to two or more users. In some instances, when the privacy policies and/or settings allow for access by the public, the consumers are any public users that use the networking platform system, including those not belonging to the posting user's social network. In other instances, when the privacy policies and/or settings limit access to the content item, the consumers include only certain users, such as those belonging to the posting user's social network. In yet other instances, the consumers include only a subgroup of users belonging to the posting user's social network according to the privacy policies and/or settings (e.g., family members, coworkers, college friends, etc.). The term "social network" as used herein refers to the social connections in which a user maintains on a networking platform system. For example, a user's social network may be a group of "followers," where the followers connect with the user to follow the user's social activities on the networking platform system (e.g. following the pinning(s) of the user's content on PINTEREST® board(s), following the user's tweets on TWITTER®, etc.). In another example, a user's social network may be a group of connected individuals added to the user's social connections on the networking platform system (e.g., FACEBOOK® friends, LinkedIn® connections, etc.).

In embodiments, social properties associated with the posting user may comprise, for example, social connections of the posting user (e.g., identity of "friends" belonging to the posting user's social network, etc.), social activities of the posting user on the networking platform system (e.g., frequency of creation or posting of content, receiving interest indications for posted content (e.g., likes on FACEBOOK®, increased number of followers on PINTEREST® boards, etc.), frequency of login to the networking platform system, frequency of commenting on content on the networking platform system, etc.), etc.

Social properties associated with the consumers may comprise, for example, identity of the consumers (i.e., identity of the user(s) authorized to access any particular posted content item), social connections of the consumers (e.g., identity of "friends" belonging to any given consumer's social network, identity of "mutual friends" who are users belonging to both the consumer's social network and the posting user's social network, etc.), social activities of the consumers on the networking platform system (e.g., frequency of login, geographic location of login, time of login, etc.), etc.

Social properties associated with the content item may comprise, for example, interest indicators received for the content (e.g., number of comments, likes, shares, follows, etc. given to the content item by users on the networking platform system), type of content (e.g., video, photograph, news article, etc.), details of the content (e.g., trending topic, subject matter, breaking news, etc.), certain metadata relating to the content (e.g., original owner or posting user), etc. For example, a content item may receive a popularity score based on the content of that item being a trending topic, where the popularity score is computed using the social properties associated with the content item.

In embodiments, the popularity score may be computed by utilizing any combination of the plurality of social properties discussed above. In one approach, the scoring mechanism uses a formula that computes a popularity score for a posting user (i.e., a user who has generated a content item on the networking platform system). The formula takes into consideration (i) social properties associated with the posting user and (ii) social properties associated with consumer(s) of a content item posted by the posting user. Note that, for the purpose of ease and clarity in the following discussion for this particular embodiment, the consumers discussed herein are limited to the users belonging to the posting user's social network (i.e., the posting user's "friends"). As such, the term "friends" and "consumers" are used interchangeably in the following discussion of the formula. In the particular embodiment discussed below, the friends are allowed access to any content item posted by the posting user, and so the friends are also consumers.

The posting user's popularity score may be generally expressed as:

$$\text{Posting User\_Score} = f(\text{user, friends})$$

The popularity of the posting user (as indicated by the popularity score) serves as an indication of the likelihood that the posting user's posted content item will be immediately accessed within a near future by at least one user (or simply, "access-request probability"). In particular, the likelihood of being immediately accessed serve as a proxy for the popularity score. Under this approach, the popularity score, or the likelihood that the content item will be immediately accessed, depends on (i) the posting user's social properties (e.g., the posting user's social connections) and (ii) the at least one friend's social properties (e.g., the at least one friend's social connections).

In embodiments, the networking platform system identifies the posting user for which a popularity score is to be computed. Identifying the posting user comprises determining the social properties of the posting user, such as social connections of the posting user (i.e, the identification of friends belonging to the posting user's social network on the networking platform system). Let $k_0$ denote the posting user and $(k_1 \ldots k_N)$ denote a plurality of friends of the posting user (i.e., the users belonging to the posting user's social network, where these particular users are authorized to access the content item). Let $v_0$ denote the content item posted by the posting user. Let t denote time units. The content item newly posted will likely be immediately accessed within the near future (i.e., the next t time units) by at least one of the plurality of friends (i.e., one of $k_1$-$k_N$) according to measures of the following probability factors: (1) at least one friend (e.g., k1) is likely to log in to the networking platform system within the near future, (2) the content item is likely recent enough in relation to other content items posted by the friends of the at least one friend, and (3) the content item newly posted will likely be found interesting enough to be accessed.

The probability factor that at least one friend from the plurality of friends is likely to log in within the near future (or simply, "login probability") may be determined by looking at the at least one friend's social properties (e.g., login activity, time of login, geographical location of login, etc.). For example, recorded data about the at least one friend's login history, which indicates that he/she has been logging in between 8 PM to 10 PM from China, in China's time, for the last 12 months, provides a probability measure that he/she will not likely be logging in to the networking service between 8 PM to 10 PM Pacific Standard Time in the U.S.

The login probability may be expressed in the following formula, where "k" represents the at least one friend and "$S_k<t$" represents the time that k will log in within the next t time units:

$$\text{Login\_Prob} = \text{Prob}(S_k < t)$$

The probability factor that the content item is likely recent (or simply, "recentness probability") may be determined by looking at the at least one friend's social properties, according to an embodiment of the present invention. In other embodiments, where the at least one friend is not given access to the content item (i.e., not a consumer), the recentness probability may be determined by looking, instead, at the social properties of the consumer "consuming" the content item.

The recentness of the content item is in relation to other content items posted by friends of the at least one friend. In particular, the recentness probability may be calculated by looking for a total number of friends belonging to the at least one friend's social network. A content item is less recent if the at least one friend has a high total number of friends. That is, the high number of friends will likely generate a great amount of content items at any point in time, and as a result, the posting user's content item is more likely to be buried in that high volume of content. For example, the posting user has two friends $k_9$ and $k_5$, both of whom are authorized to access the posting user's content item (i.e., $k_9$ and $k_5$ are consumers). Friend $k_9$ has 9999 friends while friend $k_5$ has 5 friends. The content item of the posting user, who is one out of 9999 friends of $k_9$, will likely be buried, for example, in a newsfeed with updated stories about content items posted by the 9998 friends of $k_9$. On the other hand, in the relatively empty newsfeed of friend $k_5$, the posting user's content item will appear as being recent to $k_5$. Where a content item appears recent (i.e., high recentness probability), it is more likely that $k_5$ will access that item within the near future. Thus, a measure of the recentness probability is inversely proportional to a count of friends of the at least one friend (i.e., total number of friends of the consumer).

The recentness probability may be expressed in the following formula, where Mk represents the total number of friends of the at least one friend:

$$R\_\text{Prob} = 1/Mk$$

The probability factor that the posting user's newly posted content item is likely found to be interesting (or simply, "interest probability") may be determined by looking at the posting user's social properties, particularly by looking at interest indicators received for past content items posted by that same posting user. The term "interest indicators" as used herein includes any expression of interest given by other users to an item posted on the networking platform system. The interest indicator may be, for example, a 'comment', a 'like', a 'share', etc. given to the item by a plurality of friends of the posting user on FACEBOOK®. A posting user who has received from friends a high number of interest indicators for content items posted by him/her in the past will likely attract enough interest for any newly posted content item. In embodiments, a measure of the interest probability may be captured as an average number of interest indicators (e.g., comments, likes, shares, etc.) received per past content item per friend.

Further, the interest probability measure can be higher if mutual friends have given interest indicators to the posting user's item(s). The term "mutual friend" as described herein refers to users who are connected (as friends) to the posting user in addition to being connected to one another (as friends). For example, the posting user has friends $k_1$, $k_2$, $k_3$, $k_4$, and $k_5$. Of these friends, $k_3$ is also a friend of $k_1$, where $k_1$ and $k_3$ are connected within one another's social network. In this way, $k_1$ and $k_3$ are mutual friends. On the other hand, $k_2$, $k_4$, and $k_5$ are unconnected except for their connections through the posting user. Thus, the measure of interest probability may be more accurately computed by further capturing the average number of interest indicators received per past content item per mutual friend.

As a result, the interest probability may be expressed in the following formula, where $I_{k0}$ represents interest indicators given by the friends of the posting user (i.e., friends of $k_0$) and $Z_{kk0}$ represents interest indicators given by the mutual friends (i.e., friend(s) of both k and $k_0$):

$$\text{Int\_Prob} = I_{k0}(1 + Z_{kk0})$$

Thus, the popularity score, or the likelihood that the posting user's content item will be immediately accessed within the near future by at least one of the plurality of friends, may be expressed:

generally as, $$P\_\text{Score} = f(\text{user, consumer});$$

and specifically as, $$\text{Prob}(t_{V_o} < t) = c \cdot \Sigma[\text{Prob}(S_k < t)] \times [(I_{k0}(1 + Z_{kk0}) \times (1/M_k)],$$
where c is a constant, such that, $$S(k_o < t) = \Sigma[\text{Prob}(S_k < t)] \times [(I_{k0}(1 + Z_{kk0}) \times (1/M_k)].$$

In the above formula, the posting user's popularity score is represented by $S(k_o < t)$, which is a measure of the probability that any content item posted by the posting user will be accessed within the near future (i.e., at a time less that t time units) by at least one friend (or one consumer). Thus, the score, or measure of probability, may be computed as long as information is available as to:
 (1) who is posting the content item; and
 (2) the time the content item is posted in relation to the timing of its being accessed by other users.

Information related to who is posting the content may be extracted from the historical data associated with the plurality of social properties (e.g., the posting user's posting activity, etc.). Information related to the timing of the posting may also be extracted from the historical data (e.g., the posting user's posting activity, the friends' login activity, etc.). As the posting user's score is based on the historical data (i.e., data already recorded and maintained), the score may be pre-computed ahead of time, so that the popularity score is readily available whenever any real-time processing is needed. For example, whenever a content item is newly posted by a user, the networking platform system may immediately retrieve the popularity score for that user from the user-score database which contains the pre-computed score.

In embodiments, the popularity score is pre-computed offline by using readily available historical data maintained by the networking platform system. Specifically, the networking platform system utilizes the historical data associated with the plurality of social properties. Based on this historical data, the popularity score is pre-computed for a plurality of users of the networking platform system. As used herein, the term "pre-computed" refers to computation occurring ahead of time before any real-time processing is needed. Once computed, the popularity scores for the plurality of users are stored in a user-score database. The user-score database maintains a user ID for each popularity score stored in the database, such that the popularity score for any particular user of the networking platform system may be searched and identified based on the user ID. In embodiments, the user-score database is periodically updated to refresh the plurality of popularity scores for the plurality of users. Periodically updating the user-score database includes accessing the historical data associated with the social properties, where the historical data is continuously recorded and maintained by the networking platform system. As the social properties change over time as a result of various social interactions occurring on the networking platform system, the periodical update ensures that the popularity scores reflect the "popularity" computed.

Other formulae for computing the popularity score may also be utilized by the scoring mechanism, where the scoring mechanism may apply different combinations of the plurality of social properties discussed above. In some instances, a popularity score specific to the posting user may be computed using social properties associated with a content item (in addition to the posting user's social properties and the friends' social properties), such that a content item about a trending topic gets more popularity weight than a content item about a non-trending topic. In other instances, a popularity score specific to the content item itself may be computed with no consideration for the content item's posting user, such that each content item gets a popularity score to rank it against other content items.

Various techniques of the present invention will now be described. The following description provides specific details for a thorough understanding and enabling description of these techniques. One skilled in the art will understand, however, that the invention may be practiced without many of these details. Additionally, some well-known structures or functions may not be shown or described in detail, so as to avoid unnecessarily obscuring the relevant description.

TERMINOLOGY

The terminology used throughout this application is intended to be interpreted in its broadest reasonable manner, even though it is being used in conjunction with a detailed description of certain specific examples of the technology. The words "comprise," "comprising," and the like are to be construed in an inclusive sense (i.e., to say, in the sense of "including, but not limited to"), as opposed to an exclusive or exhaustive sense. The terms "connected," "coupled," or any variant thereof means any connection or coupling, either direct or indirect, between two or more elements. Such a coupling or connection between the elements may be physical, logical, or a combination thereof. Additionally, the words "herein," "above," "below," and words of similar import, when used in this application, refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to various embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or to different embodiments.

The words "herein," "above," "below," and words of similar import, when used in this application, refer to this application as a whole and not to any particular portions of this application. The words "comprise," "comprising," and the like are to be construed in an inclusive sense (i.e., to say, in the sense of "including, but not limited to"), as opposed to an exclusive or exhaustive sense. Additionally, the terms "connected," "coupled," or any variant thereof means any connection or coupling, either direct or indirect, between two or more elements. Such a coupling or connection between the elements may be physical, logical, or a combination thereof.

Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list. Further, if the Detailed Description states a component or feature "may," "can," "could," or "might" have a characteristic or be included, that particular component or feature is not required to have that characteristic or be included.

General Description

FIG. 1 illustrates an example of a networked-based environment 100 in which some embodiments of the present invention may be utilized. Companies retain tremendous amount of data (e.g., photographs, messages, electronic documents, etc.) when conducting business. The data may be submitted through a user device 110, a mobile device 112, a personal computer 116, a laptop 114, and/or other devices to allow the data to be stored on one or more databases 130 and 132 in data centers 150 and 152. As illustrated in FIG. 1, these devices may use network 120 to submit and retrieve information from the data centers 150 and 152. Various embodiments of the present invention use access management system 160 to manage the access that the users (both end-users and employees) have to the information and data stored in data centers 150 and 152. Each data center 150, 152 includes at least one web server 122, 124, at least one cache 130, 132, and at least one database 140, 142. While two data centers 150, 152 are shown, more or fewer data centers may receive user requests for data in the system.

User device 110 may be any computing device capable of receiving user input as well as transmitting and/or receiving data via the network 120. In one embodiment, user device 110 is a conventional computer system, such as personal computer 116 or laptop 114. In another embodiment, user device 110 may be mobile device 112 having computer functionality (e.g., personal digital assistant (PDA), mobile telephone, smart-phone, etc.). User device 110 is configured to communicate with access management system 160 via the network 120. In one embodiment, user device 110 executes an application allowing a user of user device 110 to interact with the access management system 160. For example, user device 110 may execute a browser application to enable interaction between the user device 110 and access management system 160 via the network 120. In another embodiment, user device 110 interacts with access management system 160 through an application programming interface (API) that runs on the native operating system of the user device 110, such as iOS® or ANDROID™. A user may use user device 110 to send a data request for one or more items stored in the database 140, 142 and/or the cache 130, 132.

User devices 110 may be configured to communicate via network 120, which may comprise any combination of local area and/or wide area networks, using both wired and wireless communication systems. In one embodiment, network 120 uses standard communications technologies and/or protocols. Thus, network 120 may include links using technologies such as Ethernet, 802.11, worldwide interoperability for microwave access (WiMAX), 3G, 4G, CDMA, digital subscriber line (DSL), etc. Similarly, the networking protocols used on network 120 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 120 may be represented using technologies and/or formats including hypertext markup language (HTML) or extensible markup language (XML). In addition, all or some of links may be encrypted using conventional encryption technologies such as secure sockets layer (SSL), transport layer security (TLS), and Internet Protocol security (IPsec).

Figure 2:
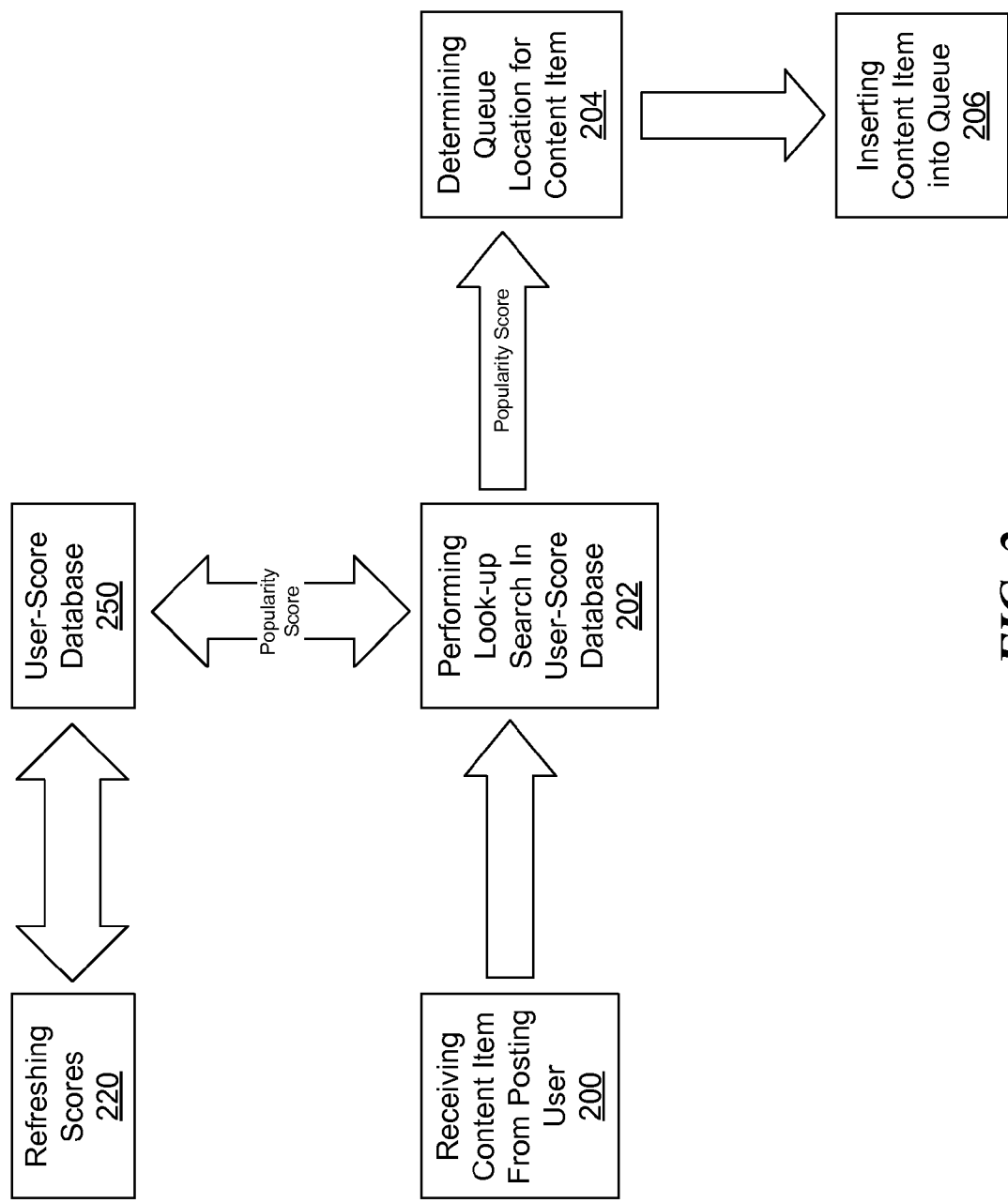
FIG. 2 is a block diagram depicting a process for inserting a content item into a cache queue based on a social cache replacement policy, according to one embodiment of the present invention.

FIG. 2 is a block diagram depicting a process for inserting a content item into a cache queue based on a social cache replacement policy, according to one embodiment of the present invention. As illustrated in FIG. 2, the process begins at step 200, where the networking platform system receives a content item posted by the posting user via the networking server. As discussed above, the content item may be, for example, a photograph uploaded by the posting user to the networking platform system, a news article shared by the posting user, a message posted by the posting user on the posting user's friend's social network space (e.g., a wall posting on a friend's FACEBOOK® page), etc.

At step 202, the networking platform system performs a look-up search for the popularity score of the posting user in user-score database 250. As discussed above, user-score database 250 contains a plurality of popularity scores associated with a plurality of users on the networking platform system. User-score database may be a part of database 140, 142. The plurality of popularity scores in user-score database 250 are associated with a plurality of plurality of users based on a user ID. The plurality of scores in user-score database 250 are periodically refreshed, or updated, as indicated by step 220, by looking at historical data associated with various social properties. Step 220 may be performed concurrently with steps 200-206, or may be performed before those steps, and/or may be performed after those steps.

In step 202, the posting user's popularity score is identified by searching for a matching user ID between the posting user and a popularity score stored in the user-score database 250. At step 204, the networking platform system incorporates the popularity score identified in step 202 to determine a queue location for placing the content item into the cache queue. As discussed above, the networking platform system may choose to utilize either a deterministic scheme or a stochastic scheme to incorporate with the popularity score when evaluating the appropriate location for insertion of an item into the queue. At step 206, the networking platform system inserts the content item into the cache queue corresponding to the queue location determined.

Figure 3:
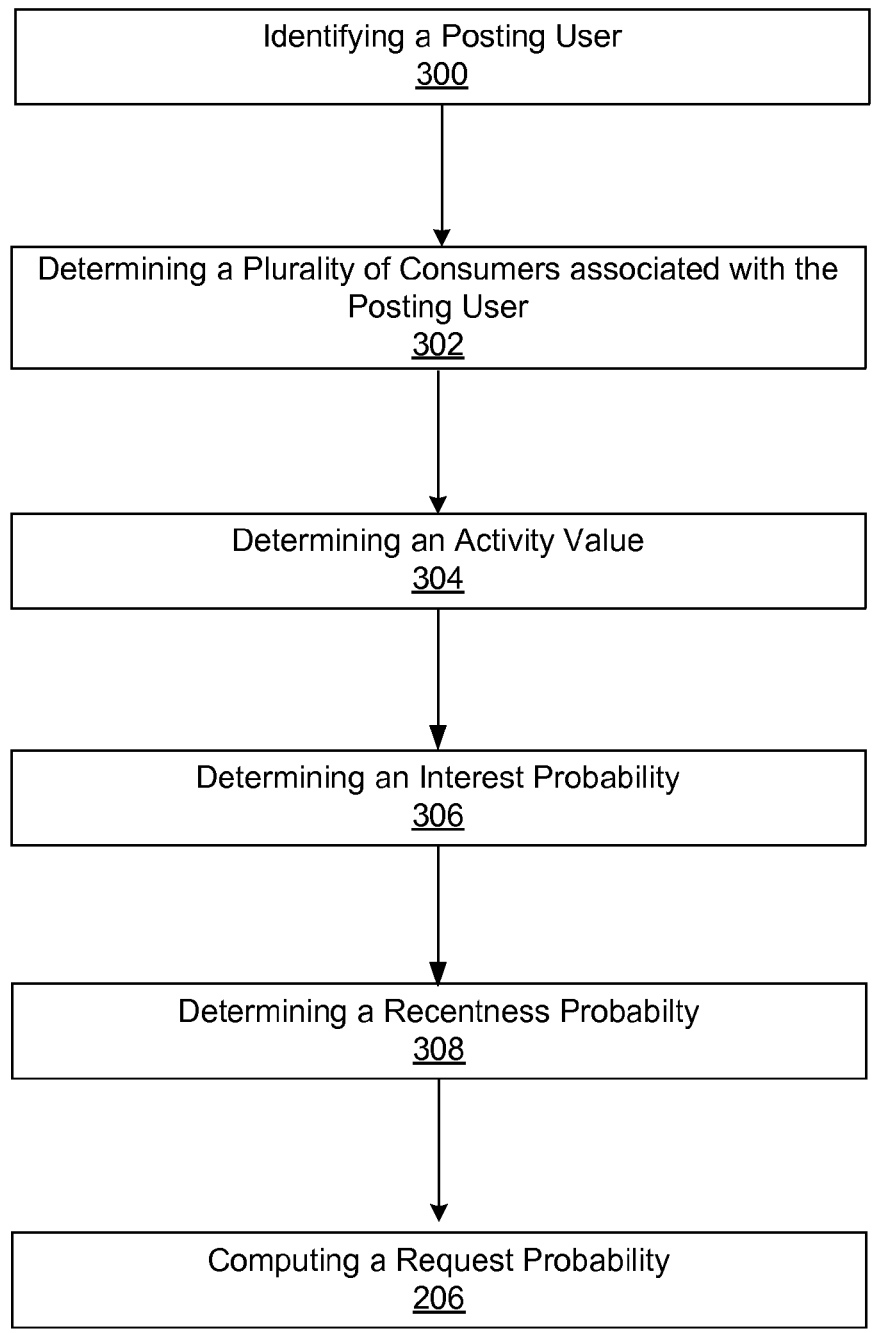
FIG. 3 is a flowchart depicting a process for computing a popularity score for a posting user according to one embodiment of the present invention.

FIG. 3 is a flowchart depicting a process for computing a popularity score for a posting user according to one embodiment of the present invention. As illustrated in FIG. 3, the process starts at step 300, where the networking platform system identifies a posting user. As discussed above, identifying a posting user comprises determining the social properties of the posting user, such as the social connections of the posting user (e.g., the identification of friends belonging to the posting user's social network on the networking platform system). At step 302, a plurality of friends belonging to the posting user's social network is determined from the posting user's social properties. As discussed above, in the embodiment, the plurality of friends constitutes the plurality of consumers allowed to access the posting user's content item. At step 304, a login probability is determined for the plurality of friends. As discussed above, a content item posted by the posting user has a high likelihood of being immediately accessed if at least one friend in the posting user's social network logs in to the networking platform system within the near future. The login probability is a measure of this likelihood.

At step 306, the networking platform system determines a recentness probability. As discussed above, the recentness probability is inversely proportional to the total number of friends belonging to the at least one friend's social network. If the at least one friend has a high number of friends, then the content item generated by the posting user is likely less recent. Whereas, if the at least one friend has a low number of friends, the recentness probability is likely higher.

At step 308, the networking platform system determines an interest probability associated with past content items posted by the posting user. As discussed above, any newly posted content item of the posting user will likely be interesting enough to attract other users if the posting user has historically posted interesting content (i.e., interesting as measured by interest indicators received). A measure of whether the posting user has historically posted interesting content is based on the average number of likes, comments, shares, etc. per past content item received from each friend. The measure is further based on, as discussed above, the average number of likes, comments, shares, etc. per past content item received from each mutual friend.

At step 310, the networking platform system determines an access-request probability based on the login probability, the recentness probability, and the interest probability. As discussed above, the access-request probability is the likelihood that any given content item posted by the posting user will be immediately accessed within the near future subsequent to its posting. Further, as discussed above, the access-request probability serves as a proxy for a popularity score associated with the posting user. At step 310, the networking platform system successfully computes the popularity score for the posting user using the login probability, the recentness probability, and the interest probability, according to one embodiment of the present invention. The computed score is subsequently stored in memory, such as a user-score database as discussed above.

Figure 4:
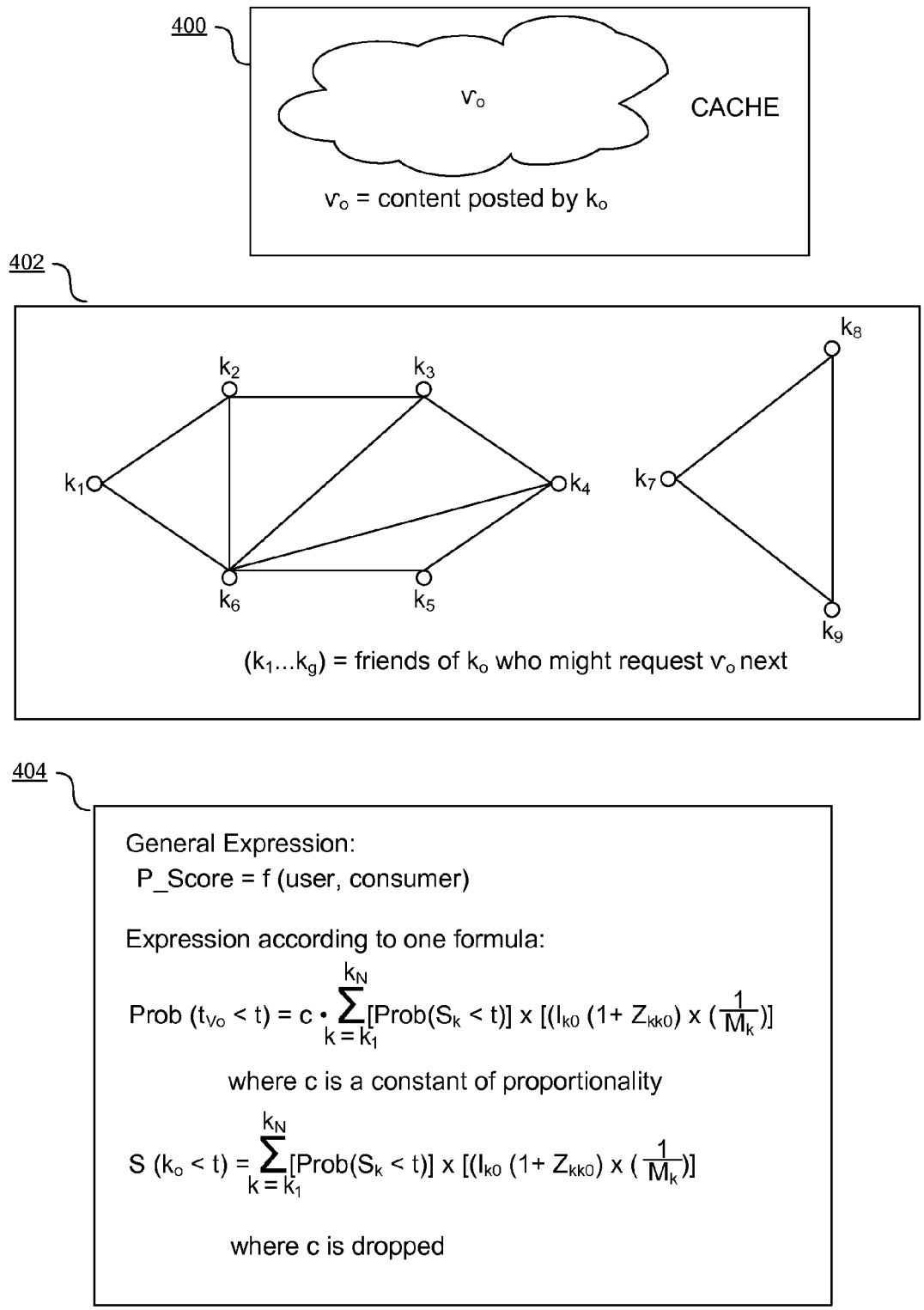
FIG. 4 is a depiction of a formula and associated variables for computing the popularity score according to one embodiment of the present invention.

FIG. 4 is a depiction of a formula and associated variables for computing the popularity score according to one embodiment of the present invention. As indicated by 400, the posting user's newly posted content item to be cached is represented by $v_0$. The queue location for inserting $v_0$ depends on the popularity score of the posting user. As indicated by 402, the posting user's social network of friends is represented by $k_1$-$k_9$. As can be seen from the depiction in 402, $k_7$-$k_9$ are mutual friends in relation to one another, and are unconnected to the rest of the posting user's friends $k_1$-$k_6$. Additional subgroups of mutual friends can be seen by the connections between the remaining friends $k_1$-$k_6$. For example, $k_1$, $k_2$, and $k_6$ are mutual friends. As indicated by 404, the popularity score may be computed according to a formula that takes into consideration the login probability, the interest probability, and the recentness probability.

Social Networking System Architecture

As mentioned above, embodiments of the present invention may be utilized within a social networking platform system. Typically, a social networking platform system includes one or more computing devices storing user profiles associated with users and/or other objects as well as connections between users and other users and/or objects. In use, users join the social networking platform system and then add connections to other users or content items of the social networking platform system to which they desire to be connected. The users may be individuals or entities such as businesses, organizations, universities, manufacturers. The social networking platform system allows its users to interact with each other as well as with other objects maintained by the social networking platform system. In some embodiments, the social networking platform system allows users to interact with third-party websites and financial account providers.

Based on stored data about users, objects and connections between users and/or objects, the social networking platform system may generate and maintain a "social graph" comprising a plurality of nodes interconnected by a plurality of edges. For example, the social graph may provide information about the social properties associated with the users, objects, and connections between users and/or objects. Each node in the social graph represents an object or user that may act on another node and/or that may be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking platform system may modify edges connecting the various nodes to reflect the interactions.

Figure 5:
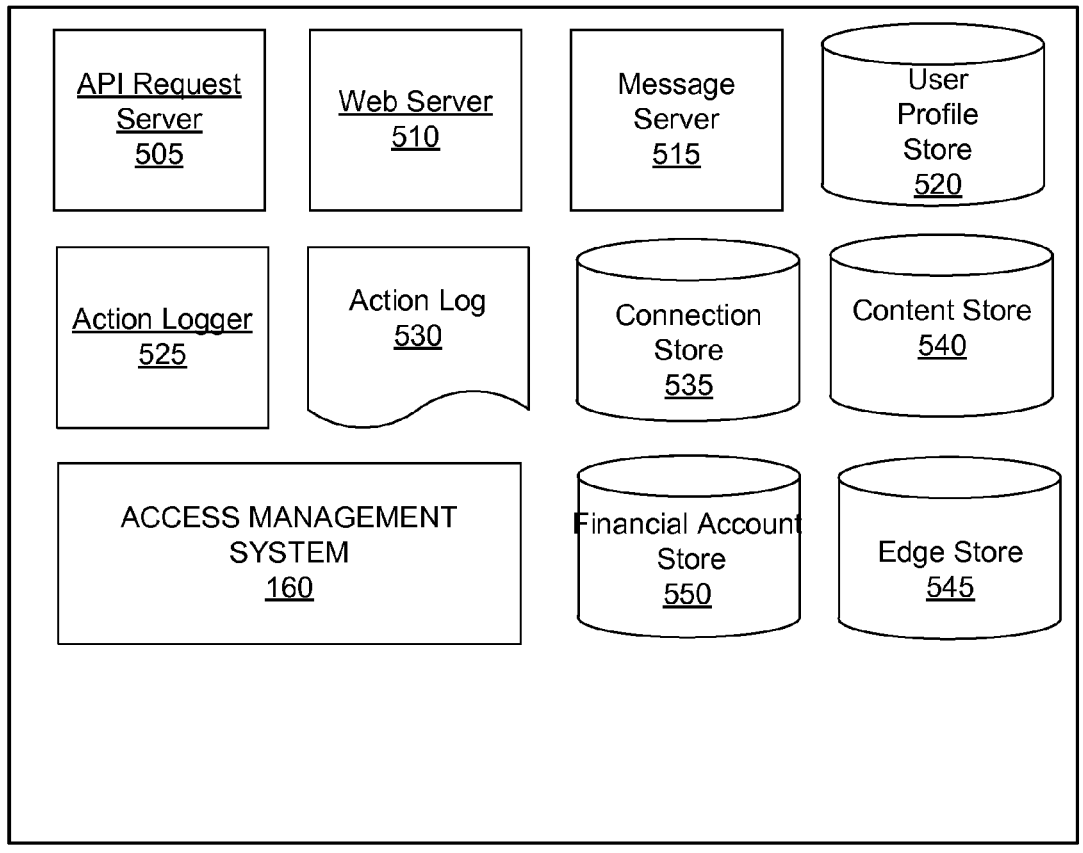
FIG. 5 is a block diagram of a system architecture of the social networking platform system with which some embodiments of the present invention may be utilized.

FIG. 5 is a block diagram of a system architecture of the social networking platform system 500 with which some embodiments of the present invention may be utilized. Social networking platform system 500 illustrated by FIG. 5 includes API request server 505, web server 510, message server 515, user profile store 520, action logger 525, action log 530, connection store 535, content store 540, edge store 545, and financial account store 550. Information in the user profile store 520, content store 540, connection store 535, edge store 545, financial account store 550, and/or action log 530 may be stored in a data center 150, 152 containing database 140, 142. Data accessed from a database 140, 142 may be stored in cache 130, 132 using the social cache policy described herein. In other embodiments, social networking platform system 500 may include additional, fewer, or different modules for various applications. Conventional components such as network interfaces, security mechanisms, load balancers, failover servers, management and network operations consoles, and the like are not shown so as to not obscure the details of the system architecture.

API request server 505 allows other systems, user devices, or tools to access information from social networking platform system 500 by calling APIs. The information provided by the social network may include user profile information or the connection information of users as determined by their individual privacy settings. For example, a system, user device, or tools interested in accessing data connections within a social networking platform system may send an API request to social networking platform system 500 via a network. The API request is received at social networking platform system 500 by API request server 505. API request server 505 processes the request by submitting the access request to access management system 160 where access is determined and any data communicated back to the requesting system, user device, or tools via a network.

Web server 510 links social networking platform system 500 via a network to one or more client devices; the web server serves web pages, as well as other web-related content, such as Java, Flash, XML, and so forth. The web server 510 may communicate with the message server 515 that provides the functionality of receiving and routing messages between social networking platform system 500 and client devices. The messages processed by message server 515 may be instant messages, queued messages (e.g., email), text and SMS (short message service) messages, or any other suitable messaging technique. In some embodiments, a message sent by a user to another may be viewed by other users of social networking platform system 500, for example, by the connections of the user receiving the message. An example of a type of message that may be viewed by other users of the social networking platform system besides the recipient of the message is a wall post. In some embodiments, a user may send a private message to another user that may only be retrieved by the other user.

Each user of the social networking platform system 500 is associated with a user profile, which is stored in user profile store 520. A user profile includes declarative information about the user that was explicitly shared by the user, and may also include profile information inferred by social networking platform system 500. In one embodiment, a user profile includes multiple data fields, each data field describing one or more attributes of the corresponding user of social networking platform system 500. The user profile information stored in user profile store 520 describes the users of social networking platform system 500, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of social networking platform system 500 displayed in an image. A user profile in user profile store 520 may also maintain references to actions by the corresponding user performed on content items in content store 540 and stored in the edge store 545.

A user profile may be associated with one or more financial accounts, allowing the user profile to include data retrieved from or derived from a financial account. A user may specify one or more privacy settings, which are stored in the user profile, that limit information from a financial account that social networking platform system 500 is permitted to access. For example, a privacy setting limits social networking platform system 500 to accessing the transaction history of the financial account and not the current account balance. As another example, a privacy setting limits social networking platform system 500 to a subset of the transaction history of the financial account, allowing social networking platform system 500 to access transactions within a specified time range, transactions involving less than a threshold transaction amounts, transactions associated with specified vendor identifiers, transactions associated with vendor identifiers other than specified vendor identifiers or any suitable criteria limiting information from a financial account identified by a user that is accessible by social networking platform system 500. In one embodiment, information from the financial account is stored in user profile store 520. In other embodiments, it may be stored in financial account store 550.

Action logger 525 receives communications about user actions on and/or off social networking platform system 500, populating action log 530 with information about user actions. Such actions may include, for example, adding a connection to another user, sending a message to another user, uploading an image, accessing content associated with another user, etc. In some embodiments, action logger 525 receives, subject to one or more privacy settings, transaction information from a financial account associated with a user and identifies user actions from the transaction information. For example, action logger 525 retrieves vendor identifiers from the financial account's transaction history and identifies an object, such as a page, in social networking platform system 500 associated with the vendor identifier. This allows action logger 525 to identify a user's purchases of products or services that are associated with a page, or another object, in content store 540. In addition, a number of actions described in connection with other objects are directed at particular users, so these actions are associated with those users as well. These actions are stored in action log 530.

Action log 530 may be used by social networking platform system 500 to track user actions on social networking platform system 500, as well as external website that communicate information to social networking platform system 500. Users may interact with various objects on networking platform system operated by social networking platform system 500, including liking/commenting on posts, sharing links, and checking-in to physical locations via a mobile device, accessing content items in a sequence or other interactions. Information describing these actions is stored in action log 530. Additional examples of interactions with objects on social networking platform system 500 included in action log 530 include commenting on a photo album, communications between users, becoming a fan of a musician, adding an event to a calendar, joining a groups, becoming a fan of a brand page, creating an event, authorizing an application, using an application and engaging in a transaction. Additionally, action log 530 records a user's interactions with advertisements on social networking platform system 500 as well as other applications operating on social networking platform system 500. In some embodiments, data from action log 530 is used to infer interests or preferences of the user, augmenting the interests included in the user profile and allowing a more complete understanding of user preferences. Action log 530 contains the data related to social network properties associated with the networking platform system.

Action log 530 may also store user actions taken on external websites and/or determined from a financial account associated with the user. For example, an e-commerce website that primarily sells sporting equipment at bargain prices may recognize a user of social networking platform system 500 through social plug-ins that enable the e-commerce website to identify the user of social networking platform system 500. Because users of social networking platform system 500 are uniquely identifiable, e-commerce websites, such as this sporting equipment retailer, may use the information about these users as they visit their websites. Action log 530 records data about these users, including webpage viewing histories, advertisements that were engaged, purchases made, and other patterns from shopping and buying. Actions identified by action logger 525 from the transaction history of a financial account associated with the user allow action log 530 to record further information about additional types of user actions.

Content store 540 stores content items associated with a user profile, such as images, videos or audio files. Content items from content store 540 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of social networking platform system 500. Examples of social networking content items include suggested connections or suggestions to perform other actions, media provided to, or maintained by, social networking platform system 500 (e.g., pictures or videos), status messages or links posted by users to the social networking platform system, events, groups, pages (e.g., representing an organization or commercial entity), and any other content provided by, or accessible via, the social networking platform system.

Content store 540 also includes one or more pages associated with entities having user profiles in user profile store 520. An entity is a non-individual user of social networking platform system 500, such as a business, a vendor, an organization or a university. A page includes content associated with an entity and instructions for presenting the content to a social networking platform system user. For example, a page identifies content associated with the entity's user profile as well as information describing how to present the content to users viewing the brand page. Vendors may be associated with pages in content store 540, allowing social networking platform system users to more easily interact with the vendor via social networking platform system 500. A vendor identifier is associated with a vendor's page, allowing social networking platform system 500 to identify the vendor and/or to retrieve additional information about the vendor from user profile store 520, action log 530 or from any other suitable source using the vendor identifier. In some embodiments, the content store 540 may also store one or more targeting criteria associated with stored objects and identifying one or more characteristics of a user to which the object is eligible to be presented.

In one embodiment, edge store 545 stores the information describing connections between users and other objects on social networking platform system 500 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in social networking platform system 500, such as expressing interest in a page on the social networking platform system, sharing a link with other users of the social networking platform system, and commenting on posts made by other users of the social networking platform system. Edge store 545 stores edge objects that include information about the edge, such as affinity scores for objects, interests, and other users. Affinity scores may be computed by social networking platform system 500 over time to approximate a user's affinity for an object, interest, and other users in social networking platform system 500 based on the actions performed by the user. Multiple interactions between a user and a specific object may be stored in one edge object in edge store 545, in one embodiment. In some embodiments, connections between users may be stored in user profile store 520, or user profile store 520 may access edge store 545 to determine connections between users.

Figure 6:
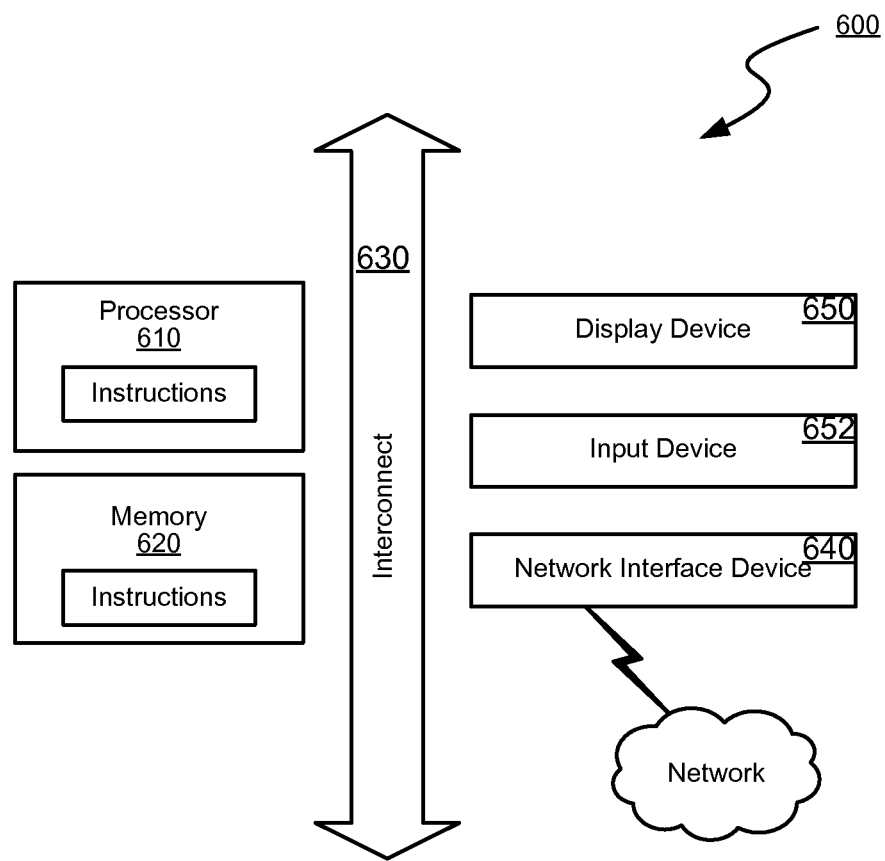
FIG. 6 is a block diagram of an architecture for a system that may be utilized to implement the techniques described herein.

In FIG. 6, the system 600 includes one or more processors 610 and memory 620 connected via an interconnect 630. The processor(s) 610 may include central processing units (CPUs) that may execute software or firmware stored in memory 620. For example, the processor(s) 610 may perform the functions of the cache replacement policy module 132. The processor(s) 610 may be, or may include, one or more programmable general-purpose or special-purpose microprocessors, digital signal processors (DSPs), programmable, application specific integrated circuits (ASICs), programmable logic devices (PLDs), or the like, or a combination of such devices.

The memory 620 represents any form of memory, such as random access memory (RAM), read-only memory (ROM), flash memory, or a combination of such devices. In use, the memory 620 may contain, among other things, a set of machine instructions which, when executed by processor 610, causes the processor 610 to perform operations to implement embodiments of the present invention, and the data stored in the memory 620 used for executing the caching algorithm.

The interconnect 630 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

Also connected to the processor(s) 610 through the interconnect 630 is a network interface device 640. The network interface device 640 may provide the system 600 with the ability to communicate with remote devices, such as remote devices accessing the cache 130, 132, and may be, for example, an Ethernet adapter or Fiber Channel adapter.

CONCLUSION

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein may also be applied to systems other than the system described above. The elements and acts of the various examples described above may be combined to provide further implementations of the invention.

Any patents and applications and other references noted above, including any that may be listed in accompanying filing papers, are incorporated herein by reference. Aspects of the invention may be modified, if necessary, to employ the systems, functions, and concepts included in such references to provide further implementations of the invention.

These and other changes may be made to the invention in light of the above Detailed Description. While the above description describes certain examples of the invention, and describes the best mode contemplated, no matter how detailed the above appears in text, the invention may be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A method performed by a computing system, comprising:
    receiving, in a networking platform system, a data item generated by a posting user of the networking platform system;
    determining, by the networking platform system, a popularity score associated with the posting user as a function of multiple social properties, the social properties including a login probability that at least one of multiple users logs in to the networking platform system within a specified time subsequent to the data item being generated;
    identifying, by the networking platform system, a queue location for the data item based on the popularity score, the queue location being a location in a cache queue of the networking platform system; and
    inserting the data item into the cache queue at the identified queue location.

2. The method of claim 1 further comprising:
    identifying, within the cache queue, a specified data item having a lowest popularity score; and
    removing the specified data item from the cache queue.

3. The method of claim 1, wherein determining the popularity score further includes:
performing a look-up search in a user-score database by matching the popularity score with the posting user based on a user ID.

4. The method of claim 1 further comprising:
storing multiple popularity scores corresponding to multiple posting users of a networking platform system in a user-score database; and
periodically updating the popularity scores in the user-score database.

5. The method of claim 1, wherein the social properties are associated with any of the posting user, a consumer of the data item, or the data item, wherein the consumer is one of the users of the networking platform system.

6. The method of claim 1, wherein the social properties include an interest probability, and wherein determining the popularity score further includes:
determining the interest probability as a function of a number of interest indicators received from a group of the users for past data items posted by the posting user, the group of the users having a social network connection to the posting user in a social network of the posting user, and
computing the popularity score based on the interest probability.

7. The method of claim 6, wherein determining the interest probability further includes:
determining the interest probability as a function of a number of interest indicators received from a subset of the group of the users for past data items posted by the posting user, the subset of group of the users having a social network connection to both the posting user and the remaining of the group of the users.

8. The method of claim 1, wherein determining the popularity score further includes:
determining the popularity score as a function of a recentness probability that the data item is likely recent, the recentness probability being one of the social properties includes.

9. The method of claim 8, wherein determining the recentness probability includes:
determining the recentness probability as a function of a total number of the users having a social network connection to a first user of the users having a social network connection with the posting user.

10. The method of claim 8, wherein the recentness probability indicates the recentness of the data item relative to multiple data items posted by users having a social network connection to a first user of the users having a social network connection with the posting user.

11. The method of claim 1, wherein determining the login probability includes:
determining a likelihood that at least one of the users logs in to the networking platform system within a specified time subsequent to the generation of the data item.

12. The method of claim 1, wherein determining the login probability includes:
determining the login probability of at least one of the users using a login history of the at least one of the users, the login history comprising login information of the at least one of the users for a specified period.

13. The method of claim 1, wherein determining the queue location includes using a placement algorithm with popularity score, the placement algorithm being at least one of a deterministic scheme or a stochastic scheme.

14. A non-transitory computer-readable storage medium storing computer-readable instructions, comprising:
instructions for selecting a posting user of a networking platform system, the posting user being a user who posts a data item in the networking platform system;
instructions for determining multiple users having an online social connection to the posting user in a social network of the posting user, the group of users authorized to access the data item;
instructions for identifying, by the networking platform system, multiple social properties, the social properties including a login probability that at least one of the users logs in to the networking platform system within a specified time subsequent to the data item being posted, the social properties including a recentness probability that the data item is likely recent; and
instructions for computing, based on the social properties, an access-request probability that is indicative of a likelihood that the data item will be accessed by the at least one of the users within the specified time.

15. The non-transitory computer-readable storage medium of claim 14 further comprising:
instructions for determining an order in which multiple data items are to be stored in a cache queue based on the access-request probabilities associated with the data items.

16. The non-transitory computer-readable storage medium of claim 14 feature comprising:
instructions for storing the access-request probability as a popularity score associated with the posting user in a user-score database.

17. The non-transitory computer-readable storage medium of claim 16 further comprising:
instructions for caching multiple data items into a cache queue by incorporating the popularity score into one or more cache replacement algorithms.

18. The non-transitory computer-readable storage medium of claim 14, wherein the instructions for computing the access-request probability include:
instructions for computing the access-request probability using historical data stored in a user score database, the historical data containing the social properties; and
instructions for storing, in the user-score database, the access-request probability as a proxy for a popularity score associated with the posting user.

19. The non-transitory computer-readable storage medium of claim 14 further comprising:
instructions for determining a queue location based on the access-request probability associated with the posting user; and
instructions for inserting the data item into a cache queue based on the queue location.

20. A system, comprising:
a processor;
a first module configured to receive a data item generated by a posting user of a networking platform system;
a second module configured to determine a popularity score associated with the posting user as a function of multiple social properties, the social properties including a login probability that at least one of multiple users logs in to the networking platform system within a specified time subsequent to the data item being generated;
a third module configured to identify a queue location for the data item based on the popularity score, the queue location being a location in a cache queue of the networking platform system; and
a fourth module configured to insert the data item into the cache queue at the determined queue location.

* * * * *